Nov. 26, 1974                    D. A. GUNTHER                3,851,043
           DISPOSING OF EXHAUST GAS FROM AN ETHYLENE OXIDE STERILIZER
                              Filed July 3, 1972
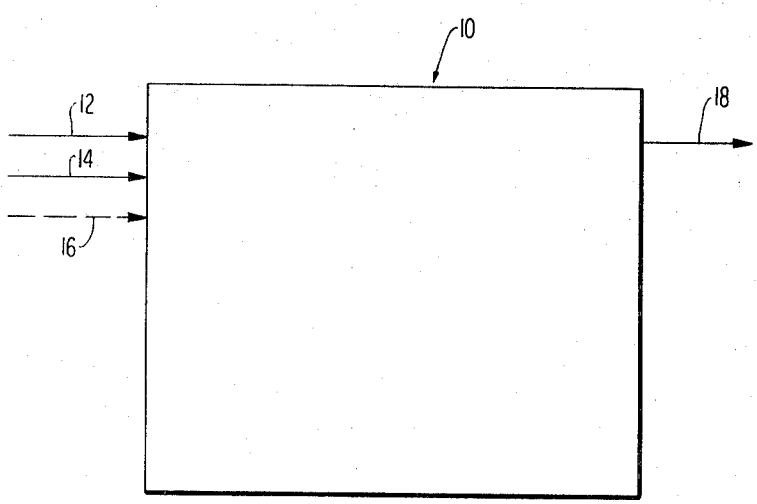
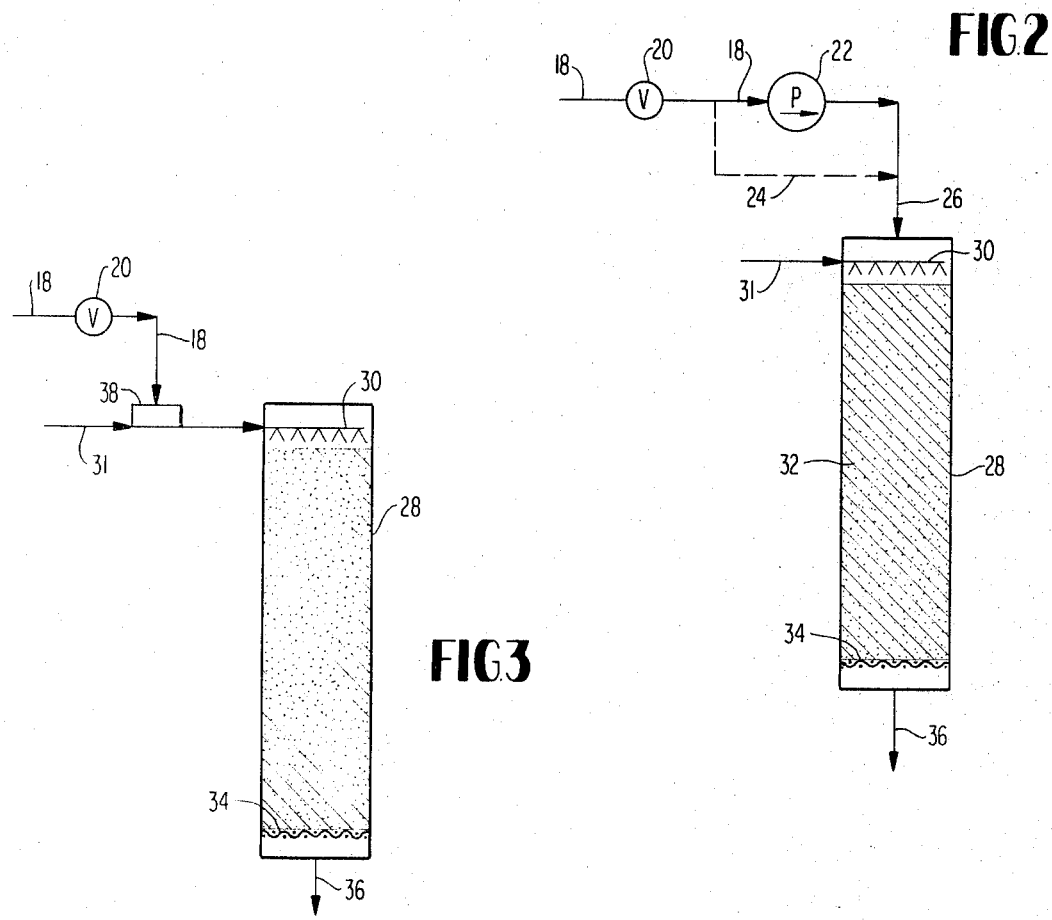

United States Patent Office 3,851,043
Patented Nov. 26, 1974

3,851,043
DISPOSING OF EXHAUST GAS FROM AN ETHYLENE OXIDE STERILIZER
Donald A. Gunther, Erie, Pa., assignor to American Sterilizer Company
Filed July 3, 1972, Ser. No. 268,647
Int. Cl. A61l 9/00, 3/02; B01d 47/00
U.S. Cl. 423—245                    7 Claims

ABSTRACT OF THE DISCLOSURE

Exhaust gas from an ethylene oxide sterilizer is cleaned of ethylene oxide by passage through a column containing an elongate bed of strong acid cation-active ion exchange resin in the hydrogen form. Very preferably, the column is vertically oriented, has one or more openings in its top portion for receiving exhaust gas and water, contains the bed of resin positioned below such opening supported on a screen, and contains an opening below the screen for discharging gas free from ethylene oxide.

BACKGROUND OF THE INVENTION

This invention relates to gas sterilization and in particular to disposal of exhaust gas from an ethylene oxide sterilizer.

Ethylene oxide sterilizers are typically utilized for example in hospitals for treating articles, for example of plastic, paper, rubber or the like which cannot withstand heat sterilization. Sterilization is effected when ethylene oxide reacts with contaminating microorganisms to kill or inactivate them.

The sterilizing is carried out in a chamber as follows. The articles are loaded, and the door to the chamber is closed. A vacuum is drawn to remove air. Then ethylene oxide in admixture with an inert diluent such as dichlorodifluoromethane is introduced until a predetermined pressure is achieved. Temperature and moisture level are adjusted. The articles are left in the chamber for a predetermined time period. After this period, gas still in the chamber is exhausted and the sterilized articles are removed for use. The exhaust gas comprises ethylene oxide, inert diluent gas and water vapor.

The conventional practice is to remove gas from the sterilizer utilizing for example a pump or exhaust fan and exhausting the same to the room or to the outside or conducting the same into a waste water line where the gas dissolves in the water and is removed to a sewer. None of these practices is entirely satisfactory from an environmental protection standpoint due to the highly toxic nature of ethylene oxide.

U.S. Pat. 2,899,266 discloses disposing of sterilizer exhaust gases by bubbling the same through a calcium chloride solution where the ethylene oxide reacts to form a precipitate. Such use of a liquid absorbing agent is awkward, and calcium chloride solution is highly corrosive and presents a safety problem.

U.S. Pats. 2,812,231, 2,965,936 and 3,163,494 disclose the physical adsorption of ethylene oxide on activated carbon or charcoal, aluminum oxide, silica gel, Fuller's earth, diatomaceous earth, kaolin or bentonite. These adsorbing agents are not specific to ethylene oxide and adsorb inert diluent and water vapor as well.

An oxidizing resin, manganese greensand, has been utilized to convert the ethylene oxide to relatively harmless ethylene glycol. This type of resin is relatively inefficient in removing ethylene oxide requiring long hold-up time or very large amounts of resin.

It is a main object of this invention to provide a system and method for chemically disposing of ethylene oxide sterilizer exhaust gas which offers maximum environment protection, which does not rely on a liquid absorbing agent or a highly corrosive liquid, which is specific to ethylene oxide permitting inert diluent and water vapor to be vented and which is extremely efficient requiring only small amounts of reactant and short sterilizer exhausting time.

These objects and others will be evident from the following detailed description.

BRIEF DESCRIPTION OF THE DRAWINGS

In describing preferred embodiments of the invention, reference is made hereinafter to the accompanying drawings in which:

FIG. 1 schematically illustrates an ethylene oxide sterilizer with the portion depicted by a dashed line being pertinent only to one of the embodiments of the invention illustrated in FIG. 2.

FIG. 2 is a schematic diagram of two different systems of preferred embodiments of the invention.

FIG. 3 is a schematic diagram of still another system of a preferred embodiment of the invention.

DESCRIPTION OF PREFERRED EMBODIMENTS

Referring to FIG. 1, a typical ethylene oxide sterilizer includes a sterilizing chamber 10 having an ethylene oxide introduction conduit 12, a humidifying composition introduction conduit 14 and an exhaust conduit 18.

Referring to FIG. 2, in one system within the scope of the invention conduit 18 contains a valve 20 and communicates at its downstream end with a vacuum pump 22 which in turn communicates with a conduit 26. Conduit 26 in turn communicates with an opening in the top portion of a vertically oriented elongated circular-cross section column 28.

Column 28 contains in its top portion a distributor 30 which communicates at its upstream end with a conduit 31 which in turn communicates with a source of water. Within column 28 and positioned below the opening communicating with conduit 26 and below distributor 30 is a bed of ion exchange resin in particulate form. The bed is elongated and is circular in cross section having a diameter conforming to the inside diameter of column 28. The bed is depicted by reference numeral 32. The bed 32 is supported within column 28 on a gas permeable means in the form of a screen 34 which is coaxial with the column 28 and is attached to the interior surface of column 28 in its lower portion. Below screen 34 in the bottom of column 28 is an opening communicating with a conduit 36 for the discharge of gas.

Column 28 is constructed of plastic, glass, stainless steel or other material which does not react with either the exhaust gas or the resin.

In general the size of column 28 is not critical. However, it should be noted that if the column is too small, it may not have enough capacity to perform its intended function; and maximum dimensions of the column may be limited by available space and convenience. Most applications are served by a column having a diameter ranging from about 3 to about 6 inches and a long dimension ranging from about 2 to about 3 feet. While the column has been described as circular in cross section, other shaped cross sections (for example, square) are quite suitable; in such case most applications are served by a column having a cross-sectional area equal to the area of a circle having a diameter ranging from about 3 to about 6 inches. The dimensions of bed 32 are essentially the same as the dimensions of column 28.

The ion exchange resin making up bed 32 is of the strong acid cation-active type and is in the hydrogen form. These resins are synthetic plastic resins containing sulfonic acid functional groups in the polymer matrix. A very suitable resin of this type is prepared by the nuclear sulfonation of styrene-divinylbenzene. Resins of this kind are sold by Rohm & Haas under the trade designations IR 120, IR 121, IR 122 and IR 200; by Diamond Alkali under the trade designations C 20 and C 25; and by Nalco under the trade designations HCR, HGR and HDR. These resins are usually available having a particle size of through 50 mesh; this particle size is quite suitable for use herein.

In the operation of the above described system, after the sterilizing period has been completed, valve 20 is opened and pump 22 is started whereby exhaust gas (comprising ethylene oxide, inert diluent and water vapor) is drawn from chamber 10 through conduit 18 and conduit 26 and enters column 28 without being exposed to the atmosphere. Water is added into column 28 through conduit 31 and distributor 30 to maintain the resin in the bed 32 wet. The pump 32 forces the gas removed from chamber 10 through the bed 32. When ethylene oxide contacts the wet resin in the bed, the epoxide ring opens and the ethylene oxide in the gas reacts with the resin and is bound thereto as a hydroxyethyl group. The water which is added coats the resin and acts as a solvent phase in which reaction is carried out. The rate of passage of gas through the column is adjusted to provide the required residence time for such reaction and is easily established for a particular sterilizer by a few trial runs. Gas emitting from the bottom of bed 32 passes through a screen member 34 and is vented through conduit 36.

The water that is added through distributor 30 is preferably added continuously. Initial addition only or intermittent addition are less preferred methods. The rate and amount of water addition depends on how much water evaporates upon contact with the gas passing through the system and leaves in the gaseous effluent from conduit 36.

The temperature in the column is not positively controlled and will depend upon the temperature of the entering gas and the temperature of the entering water. The temperature will of course have an effect on the rate of water vaporization and therefore the rate of water addition will be dependent upon this factor also.

The column with the dimensions described contains sufficient resin for a number of exhaust cycles. When the resin becomes spent, that is when it no longer reacts with the ethylene oxide, bed 32 can be removed from column 28 and the column refilled with resin to provide a fresh bed. Alternatively, the resin can be regenerated by passage therethrough of an aqueous solution of strong acid, for example a 5% aqueous solution of hydrochloric acid.

The above described system removes substantially all the ethylene oxide from the exhaust gas thereby venting a stream through conduit 36 that consists essentially of wet inert diluent gas which is harmless and nonpolluting. The system functions extremely efficiently, typically cleaning the entire amount of exhaust gas from chamber 10 in a period ranging from about 5 minutes to about 15 minutes. The resin is quite specific to ethylene oxide. Moreover, it is easily handled and does not present safety problems.

In a variation of the above system depicted in FIGS. 1 and 2, the sterilizing chamber is flushed utilizing air at a pressure above atmospheric, e.g. compressed air, admitted into chamber 10 via conduit 16 (see FIG. 1) which communicates with a source of such air, pump 22 is omitted and the exhaust gas proceeds via conduits 18, 24 (FIG. 2) and 26 into the top portion of column 28. Otherwise the system functions the same as described above and produces equivalent results.

In still another system within the scope of the invention which is depicted in FIG. 3, conduit 18 communicates at its downstream end with passageway 38 which in turn communicates with conduit 31 with the dimensions of passageway 38 being such as to provide aspirating effect to draw the exhaust gas into column 28 along with the water added through conduit 31 and distributor 30 and to force the gas through the column. The embodiment of FIG. 3 functions the same as the embodiments of FIGS. 1 and 2 with the exception of the means for removing the gas from the sterilizer and except that water must be introduced via conduit 31 continuously so as to continuously produce aspirating effect.

The following example illustrates the present invention.

EXAMPLE

The sterilizer utilized is a portable gas sterilizer having a chamber volume of approximately one cubic foot. The sterilization is carried out utilizing as a sterilizing agent ethylene oxide in admixture with dichlorodifluoromethane with a concentration of ethylene oxide in the sterilizer of about 600 milligrams per liter. The pressure in the sterilizer is 8 p.s.i.g. and the moisture level is 50% relative humidity. Sterilizing is carried out over a three hour period.

After the three hour period is completed, the sterilizer is exhausted with a system of the type depicted in FIG. 2 containing a pump 22. The resin bed is 5 inches in diameter and has a vertical dimension of 2.5 feet. The resin utilized is Rohm & Haas resin IR 120 which is of the type prepared by the nuclear sulfonation of styrene-divinylbenzene. It has a particle size of through 50 mesh. Throughout the cycle water is continuously trickled into the column through distributor 30 to maintain the resin wet. The sterilizer chamber is completely exhausted in 10 minutes, and the gaseous effluent from conduit 36 is substantially free of ethylene oxide.

Equivalent results are achieved utilizing compressed air to flush the chamber instead of the pump 22. Equivalent results are also achieved with the embodiment of FIG. 3.

Equivalent results of ethylene oxide free vent gas are achieved when the water is added initially and at the 5 minute mark instead of continuously to maintain the resin wet.

A run is carried out as described in detail above except that the oxidizing resin manganese greensand is utilized in place of the ion exchange resin. It is found that exhausting has to be carried out over a period of more than one and a half hours before the gas is vented through conduit 36 substantially free of ethylene oxide as compared to the period of 10 minutes where the present invention is utilized demonstrating the significant advantage of the present invention.

The invention may be embodied in other specific forms without departing from the spirit or essential characteristics thereof. For example, an ion exchange resin column can be utilized which is vertically oriented with the gas and water being introduced at the bottom and the cleaned gas leaving the top, or where the column is horizontally oriented. However, the vertically oriented column systems as depicted offer a significant advantage in that with a vertical system with the gas and water entering the bottom or with a horizontal system, air pockets or slugs of water form which carry resin through the column necessitating special packing means whereas this is not a problem with the systems as depicted. Thus, a vertically oriented column with the gas and water entering at the top as depicted is strongly preferred.

In view of the variations that are readily understood to come within the limits of the invention, such limits are defined by the scope of the appended claims.

What is claimed is:

1. Method of disposing of gas from an ethylene oxide sterilizer comprising
   removing said gas from the sterilizer without exposing the same to the atmosphere,
   passing said gas through a column containing an elongate bed of strong acid cation-active ion exchange resin in the hydrogen form and water coating said resin to function as a reaction solvent phase whereby the ethylene oxide in said gas reacts with the resin and is bound thereto as hydroxyethyl group,
   venting gas which is free of ethylene oxide.

2. Method as recited in claim 1 wherein said water is introduced into the column continuously.

3. Method as recited in claim 1 wherein said water is introduced into the column intermittently.

4. Method as recited in claim 1 wherein the resin has a particle size of through 50 mesh.

5. Method as recited in claim 1 wherein the resin is a synthetic plastic containing sulfonic acid functional groups.

6. Method as recited in claim 5 wherein the resin is prepared by the nuclear sulfonation of styrene-divinylbenzene.

7. Method for disposing of gas from an ethylene oxide sterilizer comprising
passing said gas through a column containing an elongate bed of strong acid cation-active ion exchange resin in the hydrogen form and water coating said resin to function as a reaction solvent phase whereby the ethylene oxide in said gas reacts with the resin and is bound thereto as hydroxyethyl group,
venting gas which is free of ethylene oxide.

References Cited
UNITED STATES PATENTS

| | | | |
|---|---|---|---|
| 2,899,266 | 8/1959 | Gewalt et al. | 21—58 |
| 2,840,615 | 6/1958 | Stautzenberger | 260—635 E |
| 3,549,312 | 12/1970 | Ernst | 21—58 |

OTHER REFERENCES

Hamilton et al., "Vapor Phase Hydration of Ethylene Oxide," Industrial Engineering Chemistry, May 1957, pp. 838–846.

Reed et al., "Catalytic Hydration of Ethylene Oxide," Industrial and Engineering Chemistry, February 1956, pp. 205–208.

Perry, J. H. Chemical Engineer's Handbook, 3d ed., pp. 1453–4.

Kirk-Othmer, Encyclopedia of Science and Technology, Vol. II, pp. 894–895.

JOSEPH SCOVRONEK, Primary Examiner

B. I. HOLLANDER, Assistant Examiner

U.S. Cl. X.R.

21—58, 91, Dig. 4; 260—2.2 R, 635 E